INVENTOR.
Henry A. Kuchek 3,236,706
METHOD OF MAKING POROUS METALLIC
           ARTICLE
Henry A. Kuchek, Auburn, Mich., assignor to The Dow
 Chemical Company, Midland, Mich., a corporation of
 Delaware
       Filed Nov. 17, 1961, Ser. No. 153,061
             3 Claims. (Cl. 156—2)

This invention pertains to an improved porous metal article and a method for its preparation.

The use of metallic porous materials having inner connecting voids for filter, heat exchange elements and other uses has been greatly limited, since it has been difficult to obtain a porous metallic element which will have a required high surface area with a capilliform structure and still maintain a structurally sound metal matrix. In filters and heat exchangers, generally the material which is passed through these elements containing some solid particles of different sizes some of which are of sufficient size to result in clogging the elements. Thus, for a filter or a heat exchanger to be practical the openings must be maintained large enough to prevent clogging and reducing the effective contact area available per unit of volume.

It is an object of this invention to provide an improved porous metallic article having interconnecting voids which will have a high surface area per unit volume with interconnecting arterial type channels or voids and capillary passages or fissures extending from these arterial channels or passages. A further object is to provide a method for the preparation of such a porous metallic article.

The above and other objects are obtained by packing an inert soluble salt in granular form in a mold, preheating the mold, and casting around these granules of salt an aluminum alloy containing from 5 to 20 weight percent of magnesium and the remainder being aluminum at least of commercial purity. The metal cast around the granular salt is cooled to obtain a dendritic structure based upon the initial crystallization of an intermetallic compound of magnesium and aluminum. After cooling, the soluble inert salt is removed by dissolving it with a suitable solvent thereby leaving a porous mass of the alloy having interconnecting voids. The alloy is then contacted with an etchant which preferentially dissolves at least partially the magnesium-rich phase in the alloy.

Figure 1:
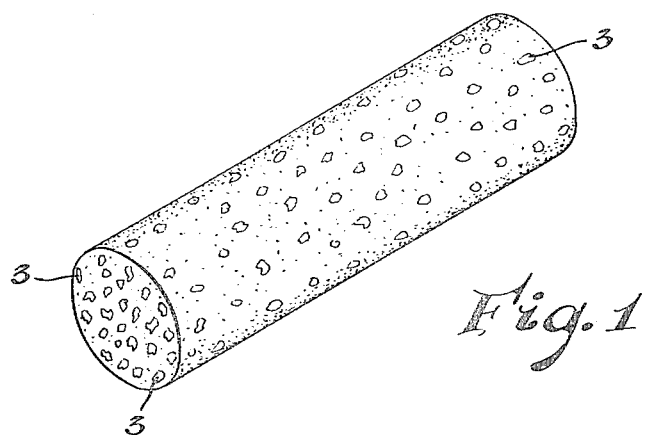
Figure 2:
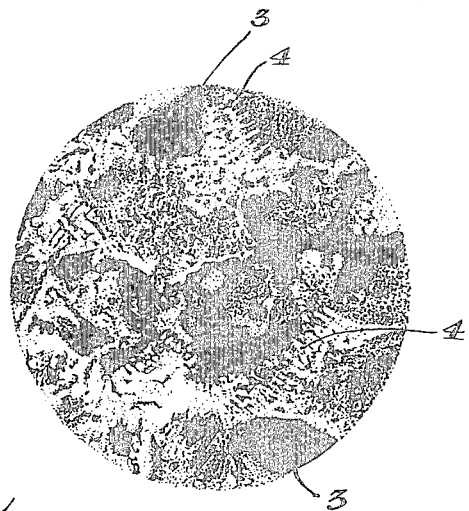

The porous article obtained by the above process is illustrated in the attached drawings, in which:

FIGURE 1 illustrates the porous article which has been made in cylindrical form, and FIGURE 2 is an enlargement of a section of FIGURE 1 showing in more detail the porous dendritic structure.

As can be seen in FIGURES 1 and 2, the porous material has interconnecting arterial voids 3 of substantially the same size as the granules of the salt used in the mold and from these arterial voids extend dendritic type capillary passages 4. These capillary type passages are generally of small size which are effective in increasing the contact surface of the material. When this material is used for a filter or heat exchanger, the effective surface for contact is substantially increased without increasing the clogging tendency of the material. In the heat exchange operation, for example, various sizes of dust particles or other impurities are generally present and if small openings are used, these immediately clog. However, by providing a material having arterial passageways of relatively large size and branching from these capillary type passageways, as in the instant invention, the impurities or dust particles are funnelled through the larger arterial passageways, while the medium free of the particles may pass through the capillary type passageways and be heated. When this material is used as a filter, clogging is decreased, since even though the arterial passages may become plugged there are many small passages extending from these arterial passages allowing the filtration action to take place.

To obtain the porous composition of this invention, it is necessary to use alloys having particular metallurgical properties. These alloys must have a metal matrix containing a second phase, such as an intermetallic compound, in a dendritic pattern. Alloys of aluminum containing from 5 to 20 percent magnesium have this particular characteristic. These alloys are cooled from the liquid state at the known rates to give a dendritic structure due to the initial dendritic crystallization of the intermetallic compound. Alloys containing less than 5 percent of the alloying metal will only have one phase present and be inoperative. With alloys containing more than 20 weight percent of the alloying metal, the alloy content is too high and the second phase will be found as discreet massive particles completely surrounded by the matrix of the base metal. If this metal is exposed to an etching acid, it will be etched quite smoothly with no significant amount of channeling into small intricate elongated passages. Thus, etching the metal will do little more than enlarge the massive voids originally filled with salt.

Any salt which is inert or substantially nonreactive with the alloy and has a melting point above that of the alloy of magnesium and aluminum may be used as the granular material for packing in the mold. The salt must be soluble in a fluid so that it may be removed from the metal cast around the void of the salt without dissolving excessive amounts of the metal. For example, inorganic salts such as alkali metal halides, alkaline earth halides, alkali metal borates and the like may be used. These salts are soluble in water and after casting the alloy around the salt, the salt may be readily removed by dissolving with water. Other salts which also are soluble in other mediums, such as organic solvents, may also be used.

After the granular salt is removed, the porous alloy is then contacted with an etchant or a selective solvent for metal which will selectively dissolve more rapidly the magnesium-rich phase. In aluminum alloys, the intermetallic compound crystallizes out with the magnesium-rich phase and this phase is the one which is preferentially dissolved. Acids such as hydrochloric acid, acetic acid, sulfuric acid, nitric acid, glycolic acid are most commonly used. Aqueous acid solutions or other solutions of acids in alcohols or organic diluents may also be used. The concentration is adjusted to obtain the desired rate of dissolution of the metal. For example, with hydrochloric acid, solutions of from 5 to 35 percent may be used. With a higher concentrated acid solution generally the contact time is less, while with a more dilute solution longer contact times are necessary.

To further illustrate the invention, an aluminum alloy having a composition of approximately 15 percent magnesium and a balance aluminum was cast in a 6-inch diameter by 16-inch deep steel mold which was filled with sodium chloride granules having an 8 to 12 mesh size (U.S. Standard Sieve Sizes). The mold with the granules was preheated to approximately 1250° F. and the aluminum alloy at a temperature of 1400° F. was poured into the mold. The alloy flowed around the salt granules to form a salt-containing metal mass. The mold was allowed to cool at a rate of approximately 400° F. per hour resulting in the dendritic crystallization of the intermetallic compound in the base metal. After solidification, the metal-salt product was leached with water to remove all traces of sodium chloride. The resulting porous alloy contained 35 percent metal on the basis of weight per unit volume. This test structure was immersed in 35 weight percent hydrochloric acid at 2 minute intervals. After rinsing and drying, the porous structure was examined and the metal weight per unit volume calculated. In the first 2 minutes, the metal weight per unit volume was decreased to 24 percent, after the second 2 minute interval, to 21 percent, then to 15 and then finally to 13. At the end of 8 minutes substantially all the second phase present had dissolved out. When a 5 percent hydrochloric acid solution was used, it required approximately another 20 minutes to dissolve out the dendritic phase to this extent.

When the etched metal sponge was examined under a microscope, it was noted the basic pore size or voids left after removal of the salt were not substantially enlarged by the leaching. However, the base metal remaining after leaching had capilliform passageways caused by preferential dissolution of the magnesium-rich phase of the alloy. The porous structure remaining was rigid and had sufficient strength to be used as a filter which functioned a considerable time without clogging. Also, it is effective for use as a heat exchanger element.

What is claimed is:

1. A process for the preparation of a porous article which comprises packing an inert soluble salt in granular form in a mold, preheating the mold, casting in said mold an aluminum alloy containing from 5 to 20 weight percent of magnesium and the remainder being substantially aluminum, cooling the cast alloy in the mold to obtain a dendritic structure of the alloying phase in the base metal, leaching the soluble salt from the cast alloy with water, and contacting the salt free cast alloy with an etchant to selectively dissolve the magnesium-rich phase.

2. A process according to claim 1 wherein the soluble salt is sodium chloride and the etchant is hydrochloric acid.

3. A process according to claim 2 wherein the alloy is an aluminum alloy containing about 5 weight percent of magnesium.

References Cited by the Examiner
UNITED STATES PATENTS

| 2,849,297 | 8/1958 | Wisken | 156—18 XR |
| 2,895,819 | 7/1959 | Fiedler. | |

OTHER REFERENCES

Modern Casting, Lightweight Cellular Metal, by Polonsky et al., vol. 39, No. 2, February 1961, Foam Digest (pages 57–71 relied on).

ALEXANDER WYMAN, *Primary Examiner.*

JACOB STEINBERG, *Examiner.*